United States Patent [19]

Okinoshima et al.

[11] Patent Number: 5,041,513
[45] Date of Patent: Aug. 20, 1991

[54] POLYIMIDE RESIN COMPOSITIONS

[75] Inventors: Hiroshige Okinoshima, Annaka; Hideto Kato, Takasaki, both of Japan

[73] Assignee: Shin-Etsu Chemical Co., Ltd., Tokyo, Japan

[21] Appl. No.: 531,097

[22] Filed: May 31, 1990

[30] Foreign Application Priority Data

May 31, 1989 [JP] Japan .................................. 1-138361

[51] Int. Cl.$^5$ .................... C08F 283/12; C08G 77/26; C08G 77/38; C08L 83/08
[52] U.S. Cl. ........................................ 528/10; 528/26; 528/28; 528/30; 528/33; 528/38; 525/433; 525/474
[58] Field of Search ...................... 528/10, 26, 28, 30, 528/33, 38; 525/433, 474, 928

[56] References Cited

U.S. PATENT DOCUMENTS

| | | | |
|---|---|---|---|
| 4,588,804 | 5/1986 | Fryd | 528/353 |
| 4,818,806 | 4/1989 | Kunimune et al. | 525/431 |

Primary Examiner—John Kight, III
Assistant Examiner—Kathryne E. Shelborne
Attorney, Agent, or Firm—Birch, Stewart, Kolasch & Birch

[57] ABSTRACT

A polyimide resin is prepared by polymerizing (A) a tetracarboxylic acid dianhydride component consisting essentially of 10 to 50 mol % of 2,2-bis(3,4-benzenedicarboxylic anhydride)perfluoropropane and 90 to 50 mol % of pyromelitic dianhydride or similar acid dianhydride and (B) a diamine component consisting essentially of 10 to 80 mol % of a silicon diamine and 90 to 20 mol % of an ether diamine. The polyimide resin is soluble in ordinary organic solvents to form solutions which are readily applicable to substrates, typically providing insulating protective coatings on electronic parts.

6 Claims, No Drawings

POLYIMIDE RESIN COMPOSITIONS

This invention relates to polyimide resin solution compositions suitable for forming insulating protective films on electronic parts.

BACKGROUND OF THE INVENTION

In general, polyimide resins are heat resistant, but insoluble in solvents except some high-boiling organic solvents and they cannot be directly applied to electronic parts and other substrates to form coatings thereon. It is thus a common practice to form a polyimide resin coating by dissolving a polyamic acid which is a polyimide precursor in an organic solvent to form a coating solution, applying the solution to a substrate as a thin film coating, and heating the coating at relatively high temperatures for an extended period of time for curing. More particularly, a polyimide resin coating is prepared by effecting addition reaction between a tetracarboxylic acid dianhydride and an aromatic diamine in an organic polar solvent, thereby forming a polyamic acid which is a polyimide precursor in solution form, applying it to a substrate, typically in the form of an electronic part as a thin film coating, and heating the coating at high temperatures of at least 300° C. for an extended period of time, thereby effecting dehydration and imidization.

This process includes the high-temperature, long-term heating step which is disadvantageous as a working step, especially from the standpoint of energy consumption. If heating is insufficient, then some polyamic acid would be left in the resulting resin structure, causing the polyimide resin to lose humidity resistance and corrosion resistance. Particularly for insulating protective coatings on electronic parts, such losses of resin attributes would undesirably deteriorate electronic parts to reduce their service life.

One approach for overcoming the above-mentioned problem is to prepare polyimide resins soluble in organic solvents. Then the resin solutions are applied to substrates and heated until the solvents evaporate off, obtaining resin films.

Several methods are known in the art for the preparation of organic solvent-soluble polyimide resins. One method is by heating tetracarboxylic acid dianhydrides and aromatic diamines in such solvents as phenol and halophenol for reaction to thereby form polyimide resins soluble in phenolic solvents (e.g., Japanese Patent Publication Nos. 26878/1972, 65227/1980, 187430/1983, 35026/1985, and 197731/1985). Another method is by reacting specific tetracarboxylic acid dianhydrides and specific diamines to form polyimides soluble in polar solvents having high boiling points such as N-methyl-2-pyrrolidone (e.g., Japanese Patent Publication Nos. 30319/1977, 83228/1986, and 18426/1987).

The polyimide resins prepared by the former method require careful handling and are less safe or hygienic in that when they are used as solutions in phenolic solvents to form coatings, evaporation of the solvent gives off a foul smell like cresol odor and the solvent causes chemical scald to the skin on accidental contact therewith. In turn, the polyimide resins prepared by the latter method have the problem that when they are applied to substrates as solutions in N-methyl-2-pyrrolidone which is highly hygroscopic, the coatings become white turbid due to moisture absorption, resulting in a loss of film strength. In addition, no improvement in working conditions is expected because N-methyl-2-pyrrolidone has a high boiling point so that high-temperature, long-term heating is necessary to completely remove the solvent. Thus, these resins are against the purpose of forming polyimide films of quality by low-temperature, short-term heating.

Therefore, an object of the present invention is to provide a novel and improved polyimide resin solution composition comprising a polyimide resin which is dissolvable in a low-boiling, volatile organic solvent to form a solution which is ready to form a polyimide resin film having improved adherence, heat resistance, electrical and mechanical properties through a low-temperature, short-term heating step. Another object of the invention is to provide such a polyimide resin solution composition which is shelf stable and safe.

SUMMARY OF THE INVENTION

Attempting to impart solubility in low-boiling organic solvents to polyimide resins, the inventors have found that polyimide resins which are prepared by polymerizing (A) a tetracarboxylic acid dianhydride component consisting essentially of 10 to 50 mol % of the acid dianhydride of the structural formula:

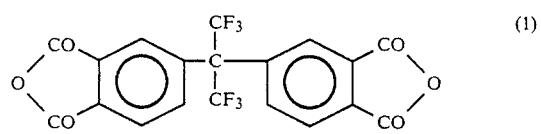

and 90 to 50 mol % of an acid dianhydride of the structural formula:

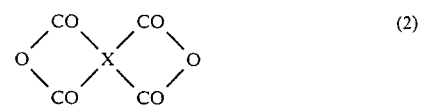

wherein X is a tetravalent organic group selected from the class consisting of

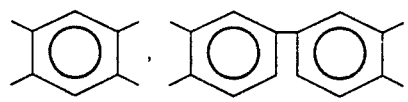

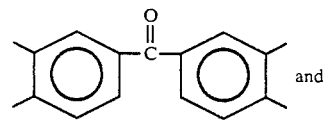

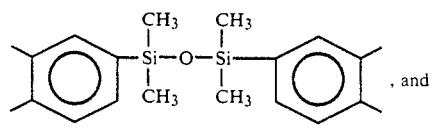

(B) a diamine component consisting essentially of 10 to 80 mol % of a silicon diamine of the structural formula:

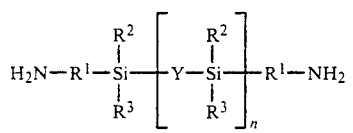

wherein $R^1$ is a divalent organic group having 1 to 18 carbon atoms, $R^2$ and $R^3$ are independently selected from unsubstituted or substituted monovalent hydrocarbon groups having 1 to 10 carbon atoms, Y is an oxygen atom or a divalent hydrocarbon group having 1 to 10 carbon atoms, and letter n is an integer of from 1 to 100, and 90 to 20 mol % of an ether diamine of the formula:

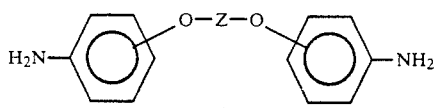

wherein Z is a divalent organic group having 6 to 18 carbon atoms containing an aromatic ring, with the proviso that diamine component (B) consists essentially of 5 to 100 mol % of the silicon diamine and 95 to 0 mol % of the ether diamine when Y in formula (3) is an oxygen atom, according to a well-known method are well soluble in low-boiling organic solvents including ether and ketone solvents as opposed to the conventional polyimide resins which are soluble only in limited solvents such as phenolic solvents and N-methyl-2-pyrrolidone and similar solvents. A polyimide resin coating can be formed from a solution of the polyimide resin in a low-boiling organic solvent through a low-temperature, short-term heating step, achieving a substantial improvement in working conditions, energy saving, and cost reduction as well as a safety and hygiene aspect. The resulting polyimide resin coating has improved adherence, heat resistance, electrical and mechanical properties. Since the polyimide resin is free of a functional group capable of gelation, it is well stable in a solvent for a long period of shelf storage without degradation.

Therefore, the present invention provides a polyimide resin composition comprising a polyimide resin in a solvent therefor, wherein said polyimide resin is prepared by polymerizing (A) a tetracarboxylic acid dianhydride component consisting essentially of 10 to 50 mol % of the acid dianhydride of formula (1) and 90 to 50 mol % of an acid dianhydride of formula (2) and (B) a diamine component consisting essentially of 10 to 80 mol % of a silicon diamine of formula (3) and 90 to 20 mol % of an ether diamine of formula (4), with the proviso that said diamine component (B) consists essentially of 5 to 100 mol % of silicon diamine of formula (3) and 95 to 0 mol % of ether diamine of formula (4) when Y in formula (3) is an oxygen atom.

DETAILED DESCRIPTION OF THE INVENTION

As described above, the polyimide resin according to the present invention is prepared by polymerizing (A) a tetracarboxylic acid dianhydride component and (B) a diamine component. Component (A) consists essentially of 2,2-bis(3,4-benzenedicarboxylic anhydride)perfluoropropane of formula (1):

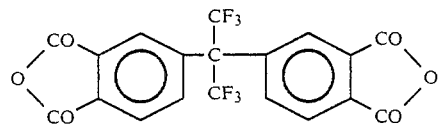

and an acid dianhydride of formula (2):

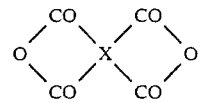

The acid dianhydride of formula (2) is selected from pyromellitic dianhydride where X is

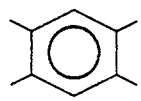

benzophenonetetracarboxylic dianhydride where X is

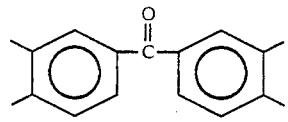

3,3',4,4'-biphenyltetracarboxylic dianhydride where X is

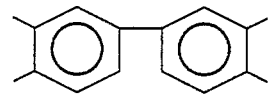

and 1,3-bis(3,4-dicarboxyphenyl)-1,1,3,3-tetramethyl-disiloxane dianhydride where X is

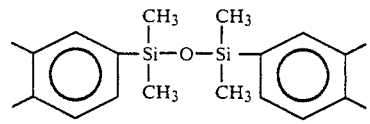

A mixture of such acid dianhydrides is also contemplated.

The benefits of the invention are obtained when the tetracarboxylic dianhydride component (A) consists essentially of 10 to 50 mol %, preferably 20 to 50 mol % of the acid dianhydride of formula (1) and 90 to 50 mol %, preferably 80 to 50 mol % off the acid dianhydride of formula (2).

The diamine component (B) used herein consists essentially of a silicon diamine of the structural formula:

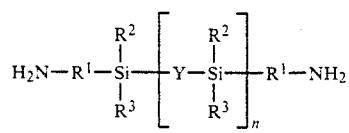

and an ether diamine of the structural formula:

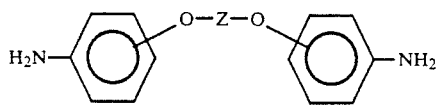 (4)

In formula (3), letter n is an integer of from 1 to 100, preferably from 1 to 60, and R¹ is selected from divalent organic groups having 1 to 18 carbon atoms, preferably having 1 to 7 carbon atoms, for example,

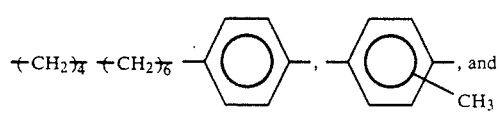

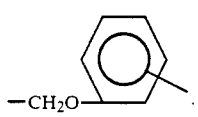

R² and R³, which may be the same or different, are indepedently selected from unsubstituted or substituted monovalent hydrocarbon groups having 1 to 10 carbon atoms, preferably having 1 to 6 carbon atoms except aliphatic unsaturated groups, for example, alkyl groups such as methyl, ethyl, propyl, and butyl groups; cycloalkyl groups such as a cyclohexyl group; aryl groups such as phenyl and tolyl groups; and substituted ones of these groups in which some or all the hydrogen atoms are replaced by halogen atoms or the like, such as chloromethyl, 2-cyanoethyl, and 3,3,3-trifluoropropyl groups.

In formula (3), Y is selected from an oxygen atom and divalent hydrocarbon groups having 1 to 10 carbon atoms, preferably having 1 to 6 carbon atoms, for example,

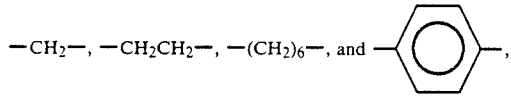

Illustrative, non-limiting examples of the diamine of formula (3) wherein Y is an oxygen atom include the following diaminosiloxanes.

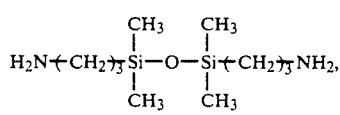

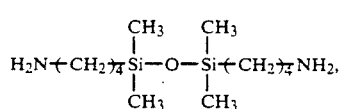

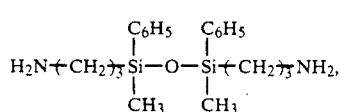

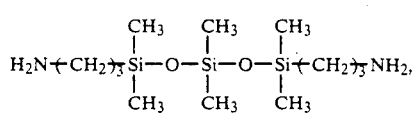

-continued

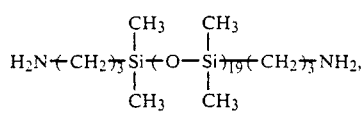

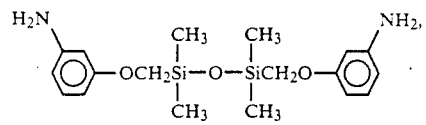

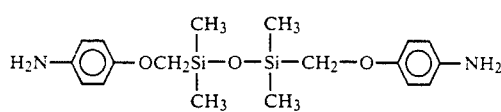

Illustrative, non-limiting examples of the diamine of formula (3) wherein Y is a divalent hydrocarbon group include the following silicon diamines.

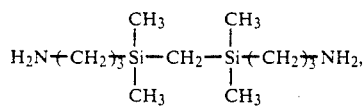

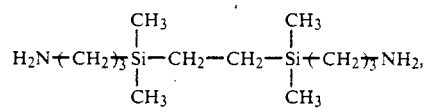

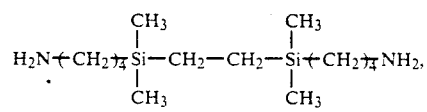

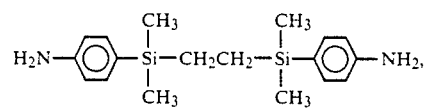

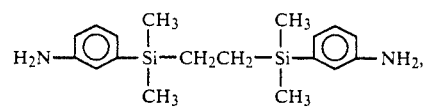

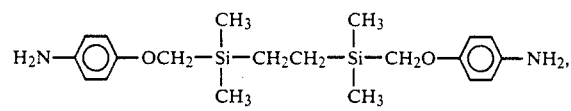

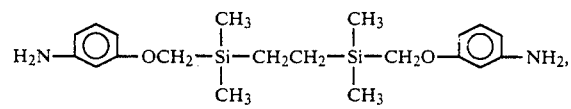

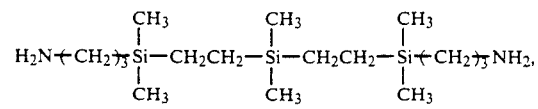

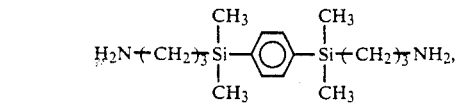

The other ingredient of diamine component (B) is an ether diamine of formula (4) wherein Z is a divalent organic group having 6 to 18 carbon atoms containing an aromatic ring. Illustrative, non-limiting examples of the ether diamines include 1,4-bis(4-aminophenoxy)benzene, 1,3-bis(4-aminophenoxy)benzene, and 1,3-bis(3-aminophenoxy)benzene where Z is

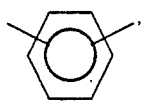

4,4'-bis(4-aminophenoxy)diphenyl where Z is

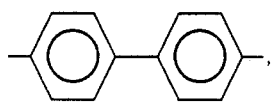

2,2-bis[4-(4-aminophenoxy)phenyl]propane where Z is

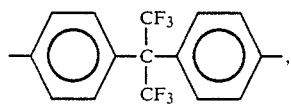

2,2-bis[4-(4-aminophenoxy)phenyl]perfluoropropane where Z is

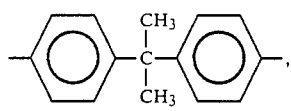

2,2-bis[4-(4-aminophenoxy)phenyl]sulfone where Z is

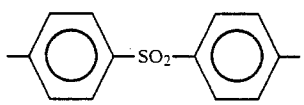

The benefits of the invention are obtained when diamine component (B) consists essentially of 10 to 80 mol %, preferably 20 to 60 mol % of the silicon diamine of formula (3) and 90 to 20 mol %, preferably 80 to 40 mol % of the ether diamine of formula (4) when Y in formula (3) is a divalent hydrocarbon group. It consists essentially of 5 to 100 mol %, preferably 20 to 80 mol % of the silicon diamine of formula (3) and 95 to 0 mol %, preferably 80 to 20 mol % of the ether diamine of formula (4) when Y in formula (3) is an oxygen atom.

Tetracarboxylic dianhydride component (A) and diamine component (B) are preferably blended in a molar ratio of from 0.9 to 1.1, more preferably from 0.95 to 1.05.

Using the above-defined tetracarboxylic dianhydride component (A) and diamine component (B) in the above-defined proportion, a polyimide resin may be prepared by any conventional well-known polymerization method. For example, predetermined amounts of tetracarboxylic dianhydride component (A) and diamine component (B) are dissolved in a polar organic solvent such as N-methyl-2-pyrrolidone, N,N'-dimethylformamide, and N,N'-dimethylacetamide and reacted at low temperatures to synthesize a polyamic acid resin which is a polyimide resin precursor. Without isolation, the reaction solution of the polyamic acid resin is heated to a temperature of 100° to 200° C., preferably 140° to 180° C. whereby dehydration ring-closing reaction takes place on the acid amide moiety of the polyamic acid resin, synthesizing the desired polyimide resin. Since water is formed as a by-product at this stage, an azeotropic dewatering solvent such as toluene and xylene is preferably used in order to complete the dehydration ring-closing reaction within a short time. The progress of this polymerization reaction can be monitored by a well-known method for detecting a change in the absorption band of an imide group in an infrared absorption spectrum (see Japanese Patent Publication No. 41330/1982). After imidization by dehydration ring-closing reaction is completed, the polyimide resin may be collected, for example, by cooling down the reaction solution and pouring the slution into methanol, thereby precipitating the resin again, followed by drying.

The thus obtained polyimide resin consists essentially of 10 to 50 mol% of recurring units of formula (a) and 90 to 50 mol % of recurring units of formula (b).

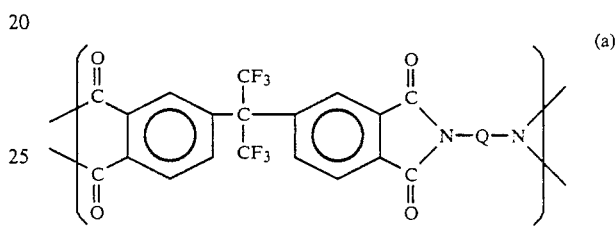

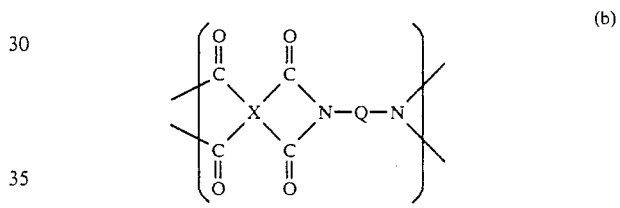

In formula (a) and (b), X is as defined above, and Q consists essentially of 10 to 80 mol % of units of formula (c):

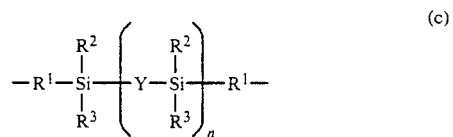

wherein $R^1$, $R^2$, $R^3$, Y, and n are as defined above, and 90 to 20 mol % of units of formula (d):

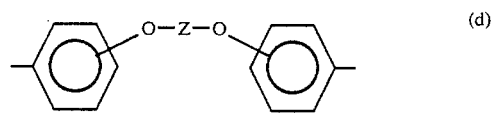

wherein Z is as defined above, with the proviso that Q consists essentially of 5 to 100 mol % of units of formula (c) and 95 to 0 mol % of units of formula (d) when Y in formula (c) is an oxygen atom.

The polyimide resin is well soluble in low-boiling organic solvents having a boiling point of less than 180° C., particularly 60° to 180° C. at normal pressures (760 mmHg), for example, ethers such as diglyme, tetrahydrofuran and 1,4-dioxane and ketones such as cyclohexanone. If desired, the polyimide resin may be dissolved in a mixture of such solvents. The polyimide resin in solution form remains stable during shelf storage without gelation or degradation. Using the polyimide resin solution, polyimide resin coatings having improved adherence, heat resistance, electrical and mechanical properties are readily obtained through a low-temperature, short-term heat treatment.

Since the polyimide resin is free of a functional group capable of gelation, the polyimide resin solution or composition remains well stable for a long period of shelf storage without degradation. Unlike the polyamic acid resin solution, the polyimide resin solution of the invention can be applied to substrates to form polyimide resin coatings thereon without a need for dewatering by a high-temperature, long-term heat treatment. For example, a protective coating can be formed on a substrate from the polyimide resin solution or composition of the invention simply by applying the resin solution to the substrate, and heating the coating at a temperature of about 120° C. to about 180° C. for about ten minutes to about one hour, thereby causing the solvent to volatilize. The resulting coating has excellent physical properties inherent to the polyimide resin and improved adherence to the substrate. Therefore, the polyimide resin solution compositions of the invention find a wide variety of applications as passivation films and protective films on semiconductor elements, junction protective films for diodes, thyristors, and transistors, alpha-radiation shields, inter-layer insulating films, and ion implantation masks for VLSI, conformable coatings of printed circuit boards, orienting films of liquid crystal display elements, protective coatings of glass fibers, and surface protective films of solar batteries.

As described above, the polyimide resin composition of the invention can utilize a low-boiling solvent, typically a low-boiling, highly-volatile ether or ketone solvent and a mixture thereof, and remains stable in solution form for a long time. A polyimide resin coating having improved adherence, heat resistance, electrical and mechanical properties is ready obtained by applying the solution to an electronic part or similar substrate and subjecting the coating to a low-temperature, short-term heat treatment. As compared with the prior art methods for the manufacture of polyimide resin coatings requiring a high-temperature, long-term heat treatment, the invention achieves a substantial energy saving and is of great commercial value.

EXAMPLE

Examples of the invention are given below by way of illustration and not by way of limitation.

EXAMPLE 1

A flask equipped with a stirrer, thermometer, and nitrogen purge tube was charged with 4.4 grams (0.01 mol) of 2,2-bis(3,4-benzenedicarboxylic anhydride)perfluoropropane and 26.5 grams (0.09 mol) of 3,3',4,4'-biphenyltetracarboxylic dianhydride as a tetracarboxylic dianhydride component and 400 grams of N-methyl-2-pyrrolidone as a solvent. To the flask was added dropwise 69 grams of an N-methyl-2-pyrrolidone solution containing 20.8 grams (0.08 mol) of 1,2-bis(γ-aminopropyldimethylsilyl)ethane and 8.2 grams (0.02 mol) of 2,2-bis[4-(4-aminophenoxy)phenyl]propane as a diamine component while the temperature of the reaction system was controlled so as not to exceed 50° C. After dropwise addition, the reaction mixture was stirred for a further ten hours at room temperature. Then the flask was equipped with a reflux condenser connected to a water collecting container and 30 grams of xylene was added to the flask. The reaction system was heated to 160° C. and maintained at the temperature for four hours to effect reaction. There was obtained a polyimide resin solution which was yellowish brown and clear. During the reaction, 3.4 grams of water formed as a by-product. The polyimide resin solution was poured into methanol from which the polyimide resin was precipitated again and isolated. Vacuum drying at 60° C. for 24 hours yielded 52.8 grams of the polyimide resin.

In an infrared absorption spectrum of this polyimide resin, no absorption attributable to polyamic acid was observed, but absorption peaks attributable to an imide group were observed at 1780 cm$^{-1}$ and 1720 cm$^{-1}$.

The polyimide resin was soluble in tetrahydrofuran, 1,4-dioxane, and cyclohexanone.

A 10% cyclohexanone solution of the polyimide resin was prepared. This solution composition had a viscosity of 32 centistokes at 25° C. as prepared. It little changed its viscosity during shelf storage as demonstrated by a viscosity of 31 centistokes at 25° C. after 6 months of shelf storage at room temperature. No precipitate was found in the aged solution. Therefore, the resin solution composition was shelf stable.

The resin solution composition was applied to each substrate of iron, nickel, aluminum, copper, glass, and silicon wafer, and heated at 150° C. for 30 minutes, obtaining a satisfactory coating of about 20 μm thick having a smooth surface on each substrate. The coatings were examined for adherence by a scribed adhesion test using Scotch tape. For all the samples, the rating was 100/100, indicating improved adherence.

EXAMPLE 2

The procedure of Example 1 was repeated except that 13.3 grams (0.03 mol) of 2,2-bis(3,4-benzenedicarboxylic anhydride)perfluoropropane and 20.6 grams (0.07 mol) of 3,3',4,4'-biphenyltetracarboxylic dianhydride were used as the tetracarboxylic diahydride component and 15.6 grams (0.06 mol) of 1,2-bis(γ-aminopropyldimethylsily)ethane and 11.7 grams (0.04 mol) of 1,4-bis(4-aminophenoxy)benzene were used as the diamine component. There was obtained 54.1 grams of a polyimide resin.

This polyimide resin was soluble in tetrahydrofuran, 1,4-dioxane, cyclohexanone, and diglyme.

A 10% cyclohexanone solution of the polyimide resin was prepared. As described in Example 1, this resin solution composition was applied to various substrates and heated at 150° C. for 30 minutes, obtaining a satisfactory coating of about 20 μm thick having a smooth surface on each substrate. The coatings showed improved adherence in a scribed adhesion test.

EXAMPLE 3

The procedure of Example 1 was repeated except that 13.3 grams (0.03 mol) of 2,2-bis(3,4-benzenedicarboxylic anhydride)perfluoropropane and 22.6 grams (0.07 mol) of 3,3',4,4'-benzophenonetetracarboxylic dianhydride were used as the tetracarboxylic dianhydride component and 2.6 grams (0.01 mol) of 1,2-bis(γ-aminopropyldimethylsilyl)ethane and 36.9 grams (0.09 mol) of 2,2-bis[4-(4-aminophenoxy)phenyl]propane were used as the diamine component. There was obtained 68.9 grams of a polyimide resin.

This polyimide resin was soluble in tetrahydrofuran, 1,4-dioxane, and cyclohexanone.

A 10% solution of the polyimide resin in tetrahydrofuran and cyclohexanone (1:1 by volume) was prepared. As described in Example 1, this resin solution composition was applied to various substrates and heated at 150° C. for 30 minutes, obtaining a satisfactory coating of about 20 μm thick having a smooth surface on each substrate. The coatings showed improved adherence irrespective of short-term heating.

EXAMPLE 4

The procedure of Example 1 was repeated except that 13.3 grams (0.03 mol) of 2,2-bis(3,4-benzenedicarboxylic anhydride)perfluoropropane and 22.6 grams (0.07 mol) of 3,3',4,4'-benzophenonetetracarboxylic dianhydride were used as the tetracarboxylic dianhydride component and 24.7 grams (0.08 mol) of 1,4-bis(γ-aminopropyldimethylsilyl)benzene and 10.4 grams (0.02 mol) of 2,2-bis[4-(4-aminophenoxy)phenyl]perfluoropropane were used as the diamine component. There was obtained 63.8 grams of a polyimide resin.

This polyimide resin was soluble in tetrahydrofuran, 1,4-dioxane, and cyclohexanone.

A 10% 1,4-dioxane solution of the polyimide resin was prepared. As described in Example 1, this resin solution composition was applied to various substrates and heated at 150° C. for 20 minutes, obtaining a satisfactory coating of about 20 μm thick having a smooth surface on each substrate. The coatings showed improved adherence.

EXAMPLE 5

The procedure of Example 1 was repeated except that 22.2 grams (0.05 mol) of 2,2-bis(3,4-benzenedicarboxylic anhydride)perfluoropropane and 21.3 grams (0.05 mol) of 1,3-bis(3,4-dicarboxyphenyl)-1,1,3,3,-tetramethyldisiloxane dianhydride were used as the tetracarboxylic dianhydride component and 9.3 grams (0.03 mol) of 1,4-bis(γ-aminopropyldimethylsilyl)benzene and 30.3 grams (0.07 mol) of bis[4-(4-aminophenoxy)phenyl]sulfone were used as the diamine component. There was obtained 75.4 grams of a polyimide resin.

This polyimide resin was soluble in tetrahydrofuran, 1,4-dioxane, cyclohexanone, and diglyme.

A 10% diglyme solution of the polyimide resin was prepared. As described in Example 1, this resin solution composition was applied to various substrates and heated at 180° C. for one hour, obtaining a satisfactory coating having improved adherence to each substrate.

EXAMPLE 6

The procedure of Example 1 was repeated except that 4.4 grams (0.01 mol) of 2,2-bis(3,4-benzenedicarboxylic anhydride)perfluoropropane and 26.5 grams (0.09 mol) of 3,3',4,4'-biphenyltetracarboxylic dianhydride were used as the tetracarboxylic dianhydride component and 24.8 grams (0.1 mol) of bis(3-aminopropyl)tetramethyldisiloxane was used as the diamine component. There was obtained 50.1 grams of a polyimide resin.

In an infrared absorption spectrum of this polyimide resin, no absorption attributable to polyamic acid was observed, but absorption peaks attributable to an imide group were observed at 1780 cm$^{-1}$ and 1720 cm$^{-1}$.

The polyimide resin was soluble in organic solvents of ethers and ketones including tetrahydrofuran, 1,4-dioxane, and cyclohexanone.

A 10% tetrahydrofuran solution of the polyimide resin was prepared. This resin solution composition had a viscosity of 25 centistokes at 25° C. as prepared. Its viscosity remained unchanged during shelf storage as demonstrated by a viscosity of 25 centistokes at 25° C. after 6 months of shelf storage at room temperature. No precipitate was found in the aged solution. Therefore, the resin solution composition was shelf stable.

The resin solution composition was applied to various substrates as described in Example 1 and heated at 150° C. for 10 minutes, obtaining a satisfactory coating of about 20 μm thick having a smooth surface on each substrate. The coatings showed improved adherence.

EXAMPLE 7

The procedure of Example 1 was repeated except that 4.4 grams (0.01 mol) of 2,2-bis(3,4-benzenedicarboxylic anhydride)perfluoropropane and 26.5 grams (0.09 mol) of 3,3',4,4'-biphenyltetracarboxylic dianhydride were used as the tetracarboxylic dianhydride component and 14.9 grams (0.06 mol) of bis(3-aminopropyl)tetramethyldisiloxane and 11.7 grams (0.04 mol) of 1,4-bis(4-aminophenoxy)benzene were used as the diamine component. There was obtained 50.8 grams of a polyimide resin.

A 10% 1,4-dioxane solution of the polyimide resin was prepared. As described in Example 1, this resin solution composition was applied to various substrates and heated at 150° C. for 30 minutes, obtaining a satisfactory coating of 20 μm thick having a smooth surface and improved adherence to each substrate.

EXAMPLE 8

The procedure of Example 1 was repeated except that 4.4 grams (0.01 mol) of 2,2-bis(3,4-benzenedicarboxylic anhydride)perfluoropropane and 26.5 grams (0.09 mol) of 3,3',4,4'-biphenyltetracarboxylic dianhydride were used as the tetracarboxylic dianhydride component and 1.2 grams (0.005 mol) of bis(3-aminopropyl)tetramethyldisiloxane and 39.0 grams (0.095 mol) of 2,2-bis[4-(4-aminophenoxy)-phenyl]propane were used as the diamine component. There was obtained 68.0 grams of a polyimide resin.

This polyimide resin was soluble in any organic ether and ketone solvents.

A 10% cyclohexanone solution of the polyimide resin was prepared. As described in Example 1, this resin solution composition was applied to various substrates and heated at 150° C. for one hour, obtaining a satisfactory coating having a smooth surface and improved adherence to each substrate.

EXAMPLE 9

The procedure of Example 1 was repeated except that 22.2 grams (0.05 mol) of 2,2-bis(3,4-benzenedicarboxylic anhydride)perfluoropropane and 16.1 grams (0.05 mol) of 3,3',4,4'-benzophenonetetracarboxylic dianhydride were used as the tetracarboxylic dianhydride component and 14.9 grams (0.06 mol) of bis(3-aminopropyl)tetramethyldisiloxane and 16.4 grams (0.04 mol) of 2,2-bis[4-(4-aminophenoxy)-phenyl]propane were used as the diamine component. There was obtained 62.3 grams of a polyimide resin.

A 10% cyclohexanone solution of the polyimide resin was prepared. As described in Example 1, this resin solution composition was applied to various substrates and heated at 150° C. for one hour, obtaining a satisfactory coating having a smooth surface and improved adherence to each substrate.

EXAMPLE 10

The procedure of Example 1 was repeated except that 22.2 grams (0.05 mol) of 2,2-bis(3,4-benzenedicarboxylic anhydride)perfluoropropane and 21.3 grams (0.05 mol) of 1,3-bis(3,4-dicarboxyphenyl)-1,1,3,3-tetramethyldisiloxane dianhydride were used as the tetracarboxylic dianhydride component and 7.5 grams (0.03 mol) of bis(3-aminopropyl)-tetramethyldisiloxane and 30.3 grams (0.07 mol) of bis[4-(4-aminophenoxy)-phenyl]sulfone were used as the diamine component. There was obtained 78.1 grams of a polyimide resin.

A 10% cyclohexanone solution of the polyimide resin was prepared. As described in Example 1, this resin solution composition was applied to various substrates and heated at 150° C. for one hour, obtaining a satisfactory coating having a smooth surface and improved adherence to each substrate.

Several preferred embodiments have been described. Obviously many modifications and variations of the present invention are possible in the light of the above teachings. It is therefore to be understood that within the scope of the appended claims, the invention may be practiced otherwise than as specifically described.

We claim:

1. A polyimide resin composition comprising a polyimide resin in a solvent therefore, wherein said polyimide resin is prepared by polymerizing (A) a tetracarboxylic acid dianhydride component consisting essentially of 10 to 50 mol % of the acid dianhydride of the structural formula:

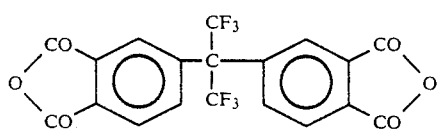

and 90 to 50 mol % of acid dianhydride of the structural formula:

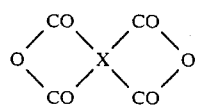

wherein X is a tetravelent organic group selected from the class consisting of

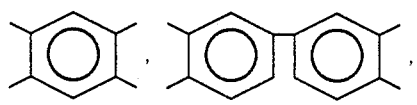

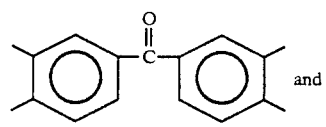

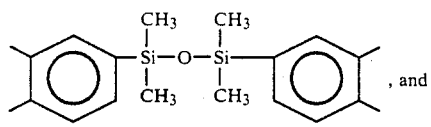

(B) a diamine component consisting essentially of 10 to 80 mol % of a silicon diamine of the structural formula:

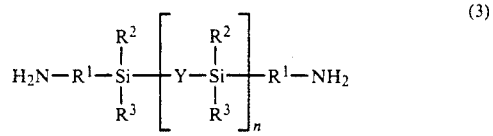

wherein $R^1$ is a divalent organic group having 1 to 18 carbon atoms, $R^2$ and $R^3$ are independently selected from unsubstituted or substituted monovalent hydrocarbon groups having 1 to 10 carbon atoms, Y is an oxygen atom or a divalent hydrocarbon group having 1 to 10 carbon atoms, and letter n is an integer of from 1 to 100, and 90 to 20 mol % of an ether diamine of the formula:

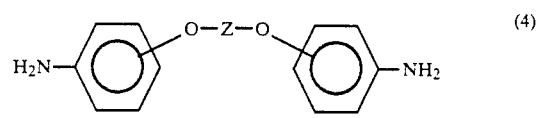

wherein Z is a divalent organic group having 6 to 18 carbon atoms containing an aromatic ring, with the proviso that diamine component (B) consists essentially of 5 to 100 mol % of the silicon diamine of formula (3) and 95 to 0 mol % of the ether diamine of formula (4) when Y in formula (3) is an oxygen atom.

2. The polyimide resin composition of claim 1, wherein Z in the formula (4) is selected from

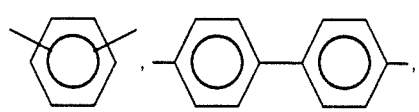

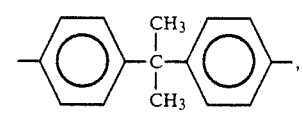

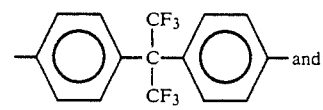

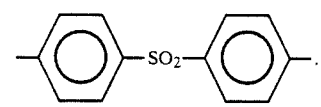

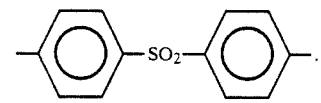

3. The polyimide resin composition of claim 1, wherein the tetracarboxylic dianhydride component (A) and the diamine component (B) are blended in a molar ratio of from 0.9 to 1.1.

4. The polyimide resin composition of claim 1, wherein the polyimide is dissolved in a solvent selected from the group consisting of ethers, ketones and mixtures thereof.

5. The polyimide resin composition of claim 4, wherein the solvent has a boiling point of 60° to 180° C.

6. A polyimide resin protective coating for an electronic part obtained from the polyimide resin composition of claim 1.

* * * * *